(12) United States Patent
Zhang et al.

(10) Patent No.: US 9,924,090 B2
(45) Date of Patent: Mar. 20, 2018

(54) METHOD AND DEVICE FOR ACQUIRING IRIS IMAGE

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/196,539

(22) Filed: Jun. 29, 2016

(65) Prior Publication Data

US 2017/0006216 A1   Jan. 5, 2017

(30) Foreign Application Priority Data

Jun. 30, 2015  (CN) .......................... 2015 1 0373998

(51) Int. Cl.
| | |
|---|---|
| *G06K 9/00* | (2006.01) |
| *H04N 5/232* | (2006.01) |
| *H04N 5/33* | (2006.01) |
| *G06K 9/20* | (2006.01) |
| *G06K 9/32* | (2006.01) |

(52) U.S. Cl.
CPC ..... *H04N 5/23219* (2013.01); *G06K 9/00604* (2013.01); *H04N 5/332* (2013.01); *G06K 9/2018* (2013.01); *G06K 9/3241* (2013.01); *G06T 2207/10004* (2013.01); *G06T 2207/10048* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2012/0308089 | A1* | 12/2012 | Lee ..................... | G06K 9/00617 382/117 |
| 2012/0328199 | A1* | 12/2012 | Woo ..................... | G06K 9/4642 382/197 |
| 2014/0147002 | A1* | 5/2014 | Park ..................... | G06K 9/0061 382/103 |
| 2015/0131051 | A1* | 5/2015 | Huang .................. | A61B 3/1216 351/206 |
| 2016/0117544 | A1* | 4/2016 | Hoyos ................. | H04N 5/23219 348/78 |

(Continued)

FOREIGN PATENT DOCUMENTS

| | | |
|---|---|---|
| CN | 103106401 | 5/2013 |
| CN | 104123543 | 10/2014 |

(Continued)

OTHER PUBLICATIONS

Iris Biometrics. Christian Rathgeb et al. 2012.*

(Continued)

*Primary Examiner* — Delomia L Gilliard
(74) *Attorney, Agent, or Firm* — Finnegan, Henderson, Farabow, Garrett & Dunner LLP (57) ABSTRACT

A method for acquiring an iris image is provided. The method includes: acquiring an image including an eye of a person; identifying a position of an eyeball in the image; determining a parameter for photographing an iris based on the position of the eyeball; and capturing the iris image based on the parameter.

15 Claims, 6 Drawing Sheets

(56) References Cited

U.S. PATENT DOCUMENTS

2016/0173492 A1\* 6/2016 Han .................... H04L 63/0861
                                                                                        705/16

FOREIGN PATENT DOCUMENTS

| CN | 104933419 | | 9/2015 |
|----|-----------|---|--------|
| CN | 105160306 A | \* | 12/2015 |
| KR | 100872495 | | 12/2008 |

OTHER PUBLICATIONS

International Search Report for International Application No. PCT/CN2015/095338, dated Mar. 17, 2016 and English translation thereof, 14 pages.

Extended European Search Report received from European Patent Office for European Application No. 16166264.8, dated May 12, 2016, 15 pages.

Christian Rathgeb et al., "Iris Biometrics," Jan. 1, 2013, ISBN: 978-1-4614-5571-4, vol. 59, pp. 7-11.

Ambika Selvakumar, "Sankara Nethralaya Atlas of Imaging in Ophthalmology," Jan. 1, 2014, pp. 21-35, 46-48, 119-130.

\* cited by examiner

METHOD AND DEVICE FOR ACQUIRING IRIS IMAGE

CROSS-REFERENCE TO RELATED APPLICATION

This application is based upon and claims a priority to Chinese Patent Application No. 201510373998.4, filed Jun. 30, 2015, the entire contents of which are incorporated herein by reference.

TECHNICAL FIELD

The present disclosure generally relates to the field of image acquisition and, more particularly, to a method and a device for acquiring an iris image.

BACKGROUND

Iris recognition technique has been widely applied to the field of biometric identification for its high uniqueness. However, the conventional method for acquiring an iris image requires a user attach an eye to an iris acquisition apparatus and actively coordinate with the iris acquisition apparatus, resulting in difficulty in using the iris acquisition apparatus.

SUMMARY

According to a first aspect of the present disclosure, there is provided a method for acquiring an iris image, comprising: acquiring an image including an eye of a person; identifying a position of an eyeball in the image; determining a parameter for photographing an iris based on the position of the eyeball; and capturing the iris image based on the parameter.

According to a second aspect of the present disclosure, there is provided a device for acquiring an iris image, comprising: a processor; and a memory for storing instructions executable by the processor. The processor is configured to: acquire an image including an eye of a person; identify a position of an eyeball in the image; determine a parameter for photographing an iris based on the position of the eyeball; and cause the iris image to be captured based on the parameter.

According to a third aspect of the present disclosure, there is provided a non-transitory computer-readable storage medium having stored therein instructions that, when executed by a processor of a device, cause the device to perform a method for acquiring an iris image, the method comprising: acquiring an image including an eye of a person; identifying a position of an eyeball in the image; determining a parameter for photographing an iris based on the position of the eyeball; and capturing the iris image based on the parameter.

It is to be understood that both the foregoing general description and the following detailed description are illustrative and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
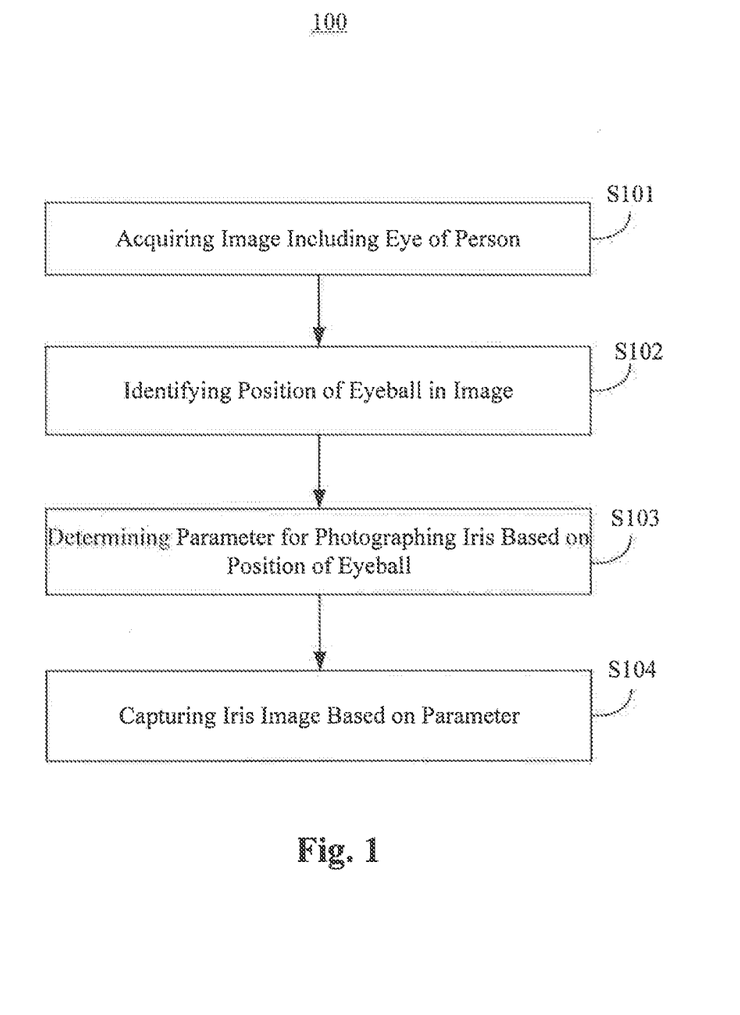
FIG. 1 is a flowchart of a method for acquiring an iris image, according to an exemplary embodiment.

FIG. 1 is a flowchart of a method 100 for acquiring an iris image, according to an exemplary embodiment. The method 100 may be performed by a device such as a mobile phone, a computer, a digital broadcast terminal, a messaging device, a gaming console, a tablet, a medical device, exercise equipment, a personal digital assistant, and the like. Referring to FIG. 1, the method 100 includes the following steps.

In step S101, the device acquires an image including an eye of a person.

For example, the step S101 may be implemented by photographing a person's eye to obtain an image. In some implementations, an AdaBoost classifier may be used to rapidly detect an area containing the eye, and the area containing the eye may be photographed for one or multiple times, so as to obtain one or more images including the eye. In some implementations, a visible light camera may be used for capturing the image.

In step S102, the device identifies a position of an eyeball in the image. For example, the device may identify the position of the eyeball by performing image recognition on the image.

In some embodiments, the device may identify a position of an eye in the image and determine a position of a center of the eyeball and a radius of the eyeball based on the eye position. For example, a Radical Symmetry Transform (RST) method may be used to identify the position of the eyeball, in which a circle is detected by calculating a gradient of each point in multiple images and subjecting all points in a radial direction to cumulative voting reversely such that the most votes are cumulated at the center of the eyeball.

In some embodiments, an AdaBoost algorithm may be used to identify a region containing the eye, and an RST may be performed in the identified region to determine the position of the center of the eyeball and the eyeball radius.

In step S103, the device determines a parameter for photographing an iris based on the position of the eyeball.

In some embodiments, the parameter may include a focal point position, a focal length, brightness and contrast, and the like, for obtaining a clear iris image with an appropriate size. For example, when the image is acquired by using a visible light camera, based on the position of the center of the eyeball, the device may determine a distance between the camera and the eyeball center position as 30 cm and current ambient brightness as 100 cd/m$^2$. Correspondingly, the focal length, brightness level, and contrast level for photographing the iris may be set as 8, −20, and 18, respectively.

In some embodiments, a focal point and a focal length for capturing a near-infrared image may be determined based on the position of the center of the eyeball and a predetermined eyeball radius, such that it is not required to determine the eyeball radius in the acquired image. As the eyeball radius does not vary significantly for each individual, an average value of the eyeball radius for a person may be stored in advance, thereby improving implementation efficacy of the method.

In step S104, the device captures an iris image based on the parameter. For example, the device may capture the iris image by photographing the iris based on the parameter.

In some embodiments, a near-infrared camera may be used to capture the iris image based on a near-infrared parameter determined in step S103, thereby improving clarity of the iris image.

In the method 100, the parameter for capturing the iris image is determined based on an image of the eye that can be acquired by a visible light camera, without requiring the user to adhere his eye to a specific position or to actively cooperate with an iris acquisition apparatus thereby improving the user experience.

Figure 2:
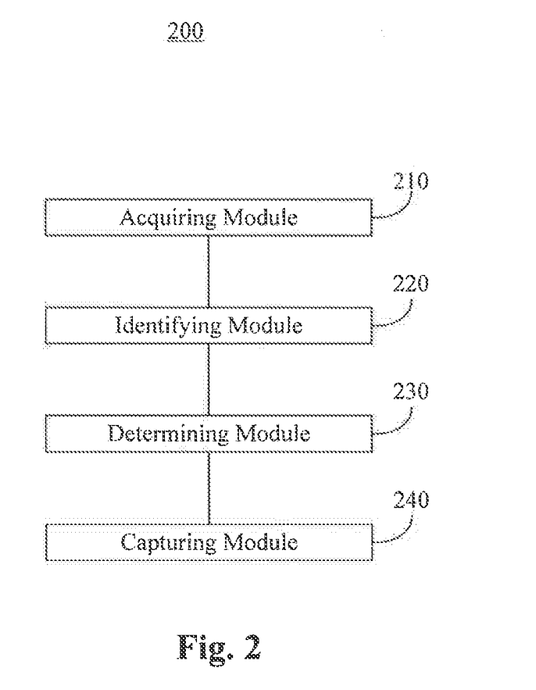
FIG. 2 is a block diagram of a device for acquiring an iris image, according to an exemplary embodiment.

FIG. 2 is a block diagram of a device 200 for acquiring an iris image, according to an exemplary embodiment. Referring to FIG. 2, the device 200 includes an acquiring module 210, an identifying module 220, a determining module 230, and a capturing module 240.

The acquiring module 210 is configured to acquire an image including an eye of a person. The identifying module 220 is configured to identify a position of an eyeball in the image. For example, the identifying module 220 may be configured to identify the position of the eyeball by performing image recognition on the image. The determining module 230 is configured to determine, based on the position of the eyeball, a parameter for photographing an iris. The capturing module 240 is configured to captures an iris image based on the parameter.

Figure 3:
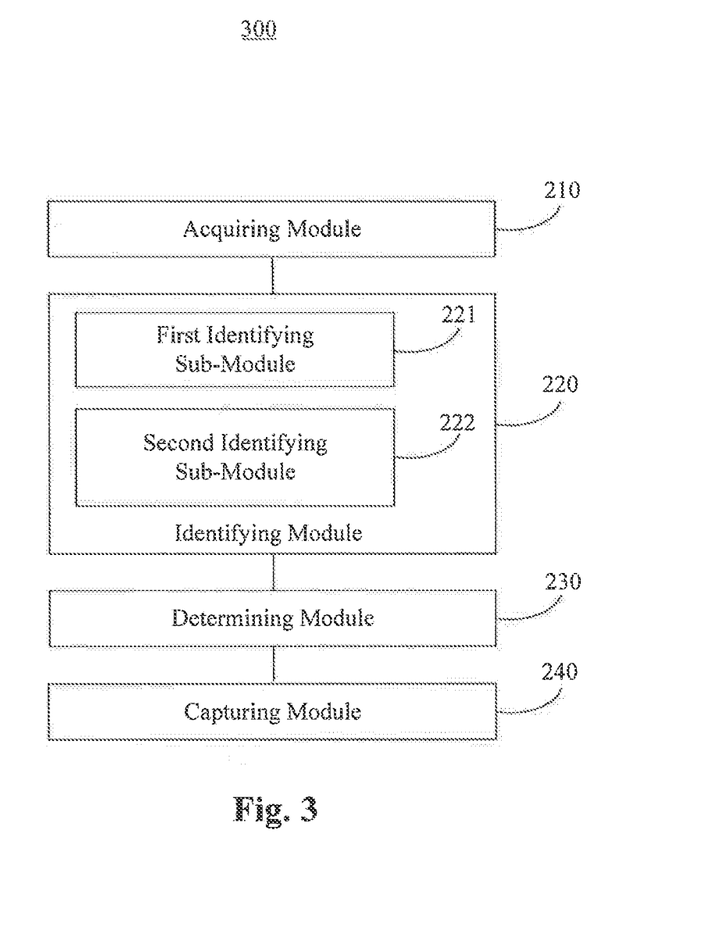
FIG. 3 is a block diagram of another device for acquiring an iris image, according to an exemplary embodiment.

FIG. 3 is a block diagram of another device 300 for acquiring an iris image, according to an exemplary embodiment. Referring to FIG. 3, the device 300 includes the acquiring module 210, identifying module 220, determining module 230, and capturing module 240, where the identifying module 220 includes a first identifying sub-module 221 and a second identifying sub-module 222.

The first identifying sub-module 221 is configured to identify a position of the eye in the image. The second identifying sub-module 222 is configured to identify a position of a center of an eyeball and a radius of the eyeball based on the position of the eye. In some embodiments, the first identifying sub-module 221 is further configured to identify a region in the image containing the eye based on a self-adaptive AdaBoost algorithm. The second identifying sub-module 222 may be further configured to identify the position of the eyeball center and the eyeball radius by performing a RST in the region.

Figure 4:
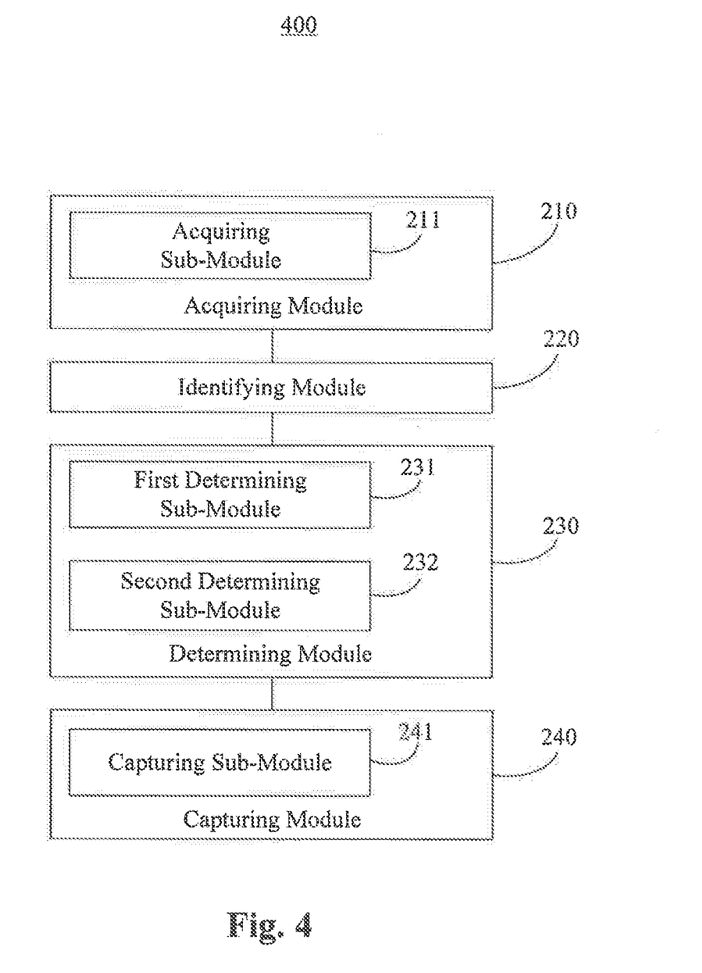
FIG. 4 is a block diagram of another device for acquiring an iris image, according to an exemplary embodiment.

FIG. 4 is a block diagram of another device 400 for acquiring an iris image, according to an exemplary embodiment. Referring to FIG. 4, the device 400 includes the acquiring module 210, identifying module 220, determining module 230, and capturing module 240, where the determining module 230 includes a first determining sub-module 231 and a second determining sub-module 232, the acquiring module 210 includes an acquiring sub-module 211, and the capturing module 240 includes a capturing sub-module 241.

The first determining sub-module 231 is configured to acquire a predetermined eyeball radius and determine a focal point and a focal length for capturing a near-infrared iris image based on the position of the center of the eyeball and the predetermined eyeball radius.

The second determining sub-module 232 is configured to determine a parameter for capturing a near-infrared iris image based on the position of the eyeball parameter in the image. Corresponding, the capturing sub-module 241 is configured to capture the near-infrared iris image based on the parameter.

The acquiring sub-module 211 is configured to photograph an eye of a person to obtain the image including the eye.

Figure 5:
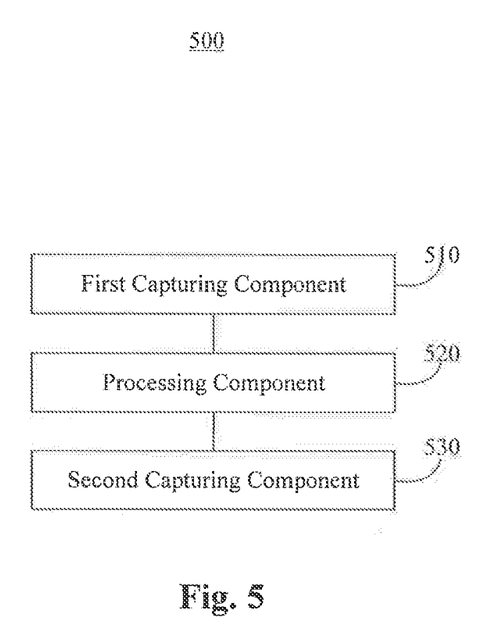
FIG. 5 is a block diagram of a device for identifying an iris, according to an exemplary embodiment.

FIG. 5 is a block diagram of a device 500 for identifying an iris, according to an exemplary embodiment. Referring to FIG. 5, the device 500 includes a first capturing component 510, a processing component 520, and a second capturing component 530.

The first capturing component 510 is configured to capture an image of an eye. The processing component 520 is configured to determine a position of an eyeball in the image and determine a parameter for photographing an iris based on the eyeball position. The second capturing component 530 is configured to capture an iris image based on the parameter and send the iris image to the processing component 520. The processing component 520 is further configured to identify iris feature information from the iris image and determine whether the iris feature information matches predetermined iris feature information.

In some embodiments, the first capturing component 510 is a visible light camera, and the second capturing component 530 is a near-infrared camera.

In other embodiments, the first capturing component 510 and the second capturing component 530 may be the same near-infrared camera.

Figure 6:
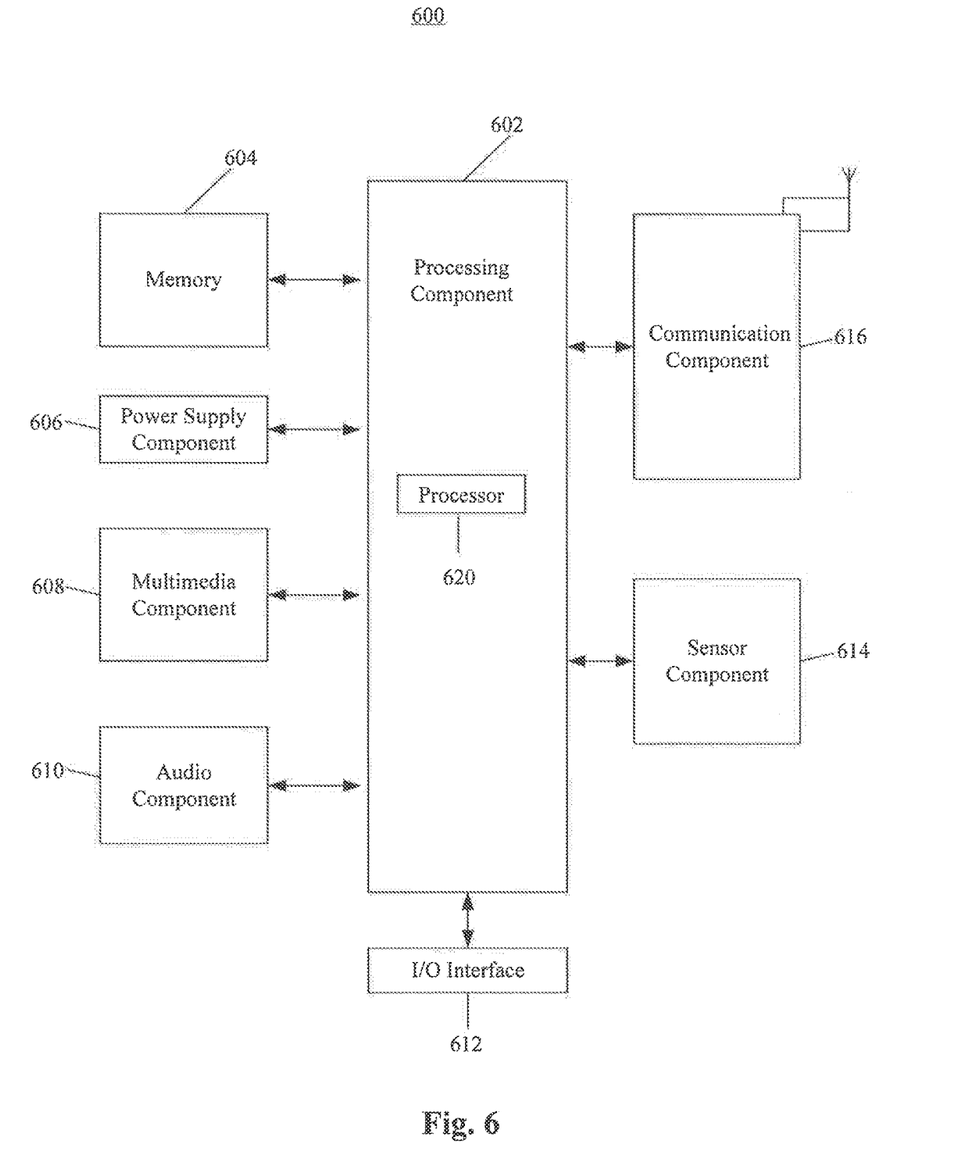
FIG. 6 is a block diagram of a device for acquiring an iris image, according to an exemplary embodiment.

FIG. 6 is a block diagram of a device 600 for acquiring an iris image, according to an exemplary embodiment. For example, the device 600 may be a mobile phone, a computer, a digital broadcast terminal, a message receiving and sending device, a gaming console, a tablet, a medical device, exercise equipment, a personal digital assistant, a vehicle mobile terminal, and the like.

Referring to FIG. 6, the device 600 may include one or more of the following components: a processing component 602, a memory 604, a power supply component 606, a multimedia component 608, an audio component 610, an input/output (I/O) interface 612, a sensor component 614, and a communication component 616. The person skilled in the art should appreciate that the structure of the device 600 as shown in FIG. 6 does not intend to limit the device 600. The device 600 may include more or less components or combine some components or other different components.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, images, video, etc. The memory 604 is also configured to store programs and modules. The processing component 602 performs various functions and data processing by operating programs and modules stored in the memory 604. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 606 is configured to provide power to various components of the device 600. The power supply component 606 may include a power management system, one or more power sources, and any other components associated with the generation, management, and distribution of power in the device 600.

The multimedia component 608 includes a screen providing an output interface between the device 600 and a user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability. In some embodiments, the multimedia component 608 may include a visible light camera and/or a near-infrared camera. The visible light camera may be used to capture an image including an eye of a person. The near-infrared camera may be used to capture an iris image by photographing an iris using a parameter determined by the processing component 602. The near-infrared camera may also be used to capture an image including an eye of a person.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an on/off state of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, 3G, 4G, or a combination thereof. In one exemplary embodiment, the communication component 616 receives a broadcast signal or broadcast information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for acquiring the iris image.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for acquiring an iris image, comprising:
   acquiring an image including an eye of a person;
   identifying a position of an eyeball in the image, comprising:
   identifying, by an iris image recognition device, a position of the eye in the image; and
   identifying, by the iris image recognition device, a position of a center of the eyeball based on the position of the eye;
   determining a parameter for photographing an iris based on the position of the eyeball, comprising:
   acquiring a predetermined eyeball radius; and
   determining a focal point and a focal length for capturing a near-infrared iris image based on the position of the center of the eyeball and the predetermined eyeball radius; and
   capturing the iris image based on the parameter.

2. The method according to claim 1, wherein identifying, by the iris image recognition device, the position of the eye in the image comprises:
   identifying a region in the image containing the eye based on an AdaBoost algorithm.

3. The method according to claim 1, wherein the position of the center of the eyeball and the radius of the eyeball are identified by performing a radial symmetry transform (RST) in the region.

4. The method according to claim 1, wherein acquiring the image comprises:
   photographing the eye of the person to obtain the image.

5. The method according to claim 1, wherein the iris image is a near-infrared image, and the parameter is used for capturing the near-infrared image.

6. The method according to claim 1, wherein the image is acquired by using a visible light camera, and the iris image is captured by using a near-infrared camera.

7. The method according to claim 1, wherein the image is acquired by using a near-infrared camera, and the iris image is captured by using the near-infrared camera.

8. A device for acquiring an iris image, comprising:
   a processor; and
   a memory for storing an instruction executable by the processor,
   wherein the processor is configured to:
   acquire an image including an eye of a person;
   identify a position of an eyeball in the image by:
   identifying a position of the eye in the image; and
   identifying a position of a center of the eyeball based on the position of the eye;
   determine a parameter for photographing an iris based on the position of the eyeball by:
   acquiring a predetermined eyeball radius; and
   determining a focal point and a focal length for capturing a near-infrared iris image based on the position of the center of the eyeball and the predetermined eyeball radius; and
   cause the iris image to be captured based on the parameter.

9. The device according to claim 8, wherein the processor is further configured to:
   identify a region in the image containing the eye based on an AdaBoost algorithm.

10. The device according to claim 8, wherein the processor is further configured to:
    perform a radial symmetry transform (RST) in the region to identify the position of the center of the eyeball and the radius of the eyeball.

11. The device according to claim 6, wherein the image is obtained by photographing the eye of the person.

12. The device according to claim 8, wherein the iris image is a near-infrared image, and the parameter is used for capturing the near-infrared image.

13. The device according to claim 8, further comprising:
    a visible light camera configured to capture the image; and
    a near-infrared camera configured to capture the iris image.

14. The device according to claim 8, further comprising:
    a near-infrared camera configured to capture the image and the iris image.

15. A non-transitory computer-readable storage medium having stored therein instructions that, when executed by a processor of a device, cause the device to perform a method for acquiring an iris image, the method comprising:
    acquiring an image including an eye of a person;
    identifying a position of an eyeball in the image, comprising:
    identifying a position of the eye in the image; and
    identifying a position of a center of the eyeball based on the position of the eye;
    determining a parameter for photographing an iris based on the position of the eyeball, comprising:
    acquiring a predetermined eyeball radius; and
    determining a focal point and a focal length for capturing a near-infrared iris image based on the position of the center of the eyeball and the predetermined eyeball radius; and
    capturing the iris image based on the parameter.

* * * * *